United States Patent
Hobbs et al.

(10) Patent No.: US 12,457,375 B2
(45) Date of Patent: Oct. 28, 2025

(54) REMOTE BULK CHANNEL MANAGEMENT

(71) Applicant: Atmosphere.tv, Austin, TX (US)

(72) Inventors: Zachary Hobbs, Austin, TX (US); Megan Bubley, Austin, TX (US)

(73) Assignee: Atmosphere.tv, Austin, TX (US)

(*) Notice: Subject to any disclaimer, the term of this patent is extended or adjusted under 35 U.S.C. 154(b) by 4 days.

(21) Appl. No.: 18/300,933

(22) Filed: Apr. 14, 2023

(65) Prior Publication Data

US 2024/0348856 A1    Oct. 17, 2024

(51) Int. Cl.
*H04N 21/422* (2011.01)
*H04L 65/61* (2022.01)

(52) U.S. Cl.
CPC ....... *H04N 21/42204* (2013.01); *H04L 65/61* (2022.05)

(58) Field of Classification Search
CPC .......... H04N 21/42204; H04L 65/61
See application file for complete search history.

(56) References Cited

U.S. PATENT DOCUMENTS

| | | | |
|---|---|---|---|
| 9,898,175 B2 * | 2/2018 | Fiedler | G08B 25/14 |
| 11,244,561 B1 | 2/2022 | Fuchs et al. | |
| 11,678,002 B1 | 6/2023 | Koopmans et al. | |
| 2006/0288373 A1 * | 12/2006 | Grimes | H04N 21/44231 725/62 |
| 2010/0153576 A1 * | 6/2010 | Wohlert | H04L 65/1059 709/231 |
| 2013/0082827 A1 * | 4/2013 | Cho | H04L 41/0873 340/12.52 |
| 2018/0176113 A1 * | 6/2018 | Thota | H04L 65/61 |
| 2020/0186857 A1 | 6/2020 | Easley et al. | |
| 2022/0095006 A1 | 3/2022 | Seed et al. | |
| 2022/0311857 A1 | 9/2022 | Sweeney et al. | |
| 2023/0059126 A1 | 2/2023 | Arling et al. | |
| 2023/0298089 A1 | 9/2023 | Peterson et al. | |

\* cited by examiner

*Primary Examiner* — Gigi L Dubasky

(57) ABSTRACT

Systems and methods are disclosed for implementing a remote bulk channel management system for simultaneously managing settings or channels for a plurality of streaming devices. In certain embodiments, a method may comprise implementing a remote bulk management control for a plurality of streaming devices, including presenting a bulk management interface at a user device showing a current setting for the plurality of streaming devices, receiving a setting change request for multiple streaming devices from the plurality of streaming devices via the bulk management interface, and implementing the setting change request at the multiple streaming devices substantially simultaneously.

20 Claims, 4 Drawing Sheets

REMOTE BULK CHANNEL MANAGEMENT

SUMMARY

In certain embodiments, a method may comprise implementing a remote bulk management control for a plurality of streaming devices, including presenting a bulk management interface at a user device showing a current setting for the plurality of streaming devices, receiving a setting change request for multiple streaming devices from the plurality of streaming devices via the bulk management interface, and implementing the setting change request at the multiple streaming devices substantially simultaneously.

In certain embodiments, a system may comprise a remote bulk management control configured to present a bulk management interface at a user device showing a current setting for a plurality of streaming devices, receive a setting change request for multiple streaming devices from the plurality of streaming devices via the bulk management interface, and implement the setting change request at the multiple streaming devices substantially simultaneously.

In certain embodiments, a memory device may store instructions that, when executed, cause a processor to perform a method comprising implementing a remote bulk management control for a plurality of streaming devices, including presenting a bulk management interface at a user device showing a current setting for the plurality of streaming devices, receiving a setting change request for multiple streaming devices from the plurality of streaming devices via the bulk management interface, and implementing the setting change request at the multiple streaming devices substantially simultaneously.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
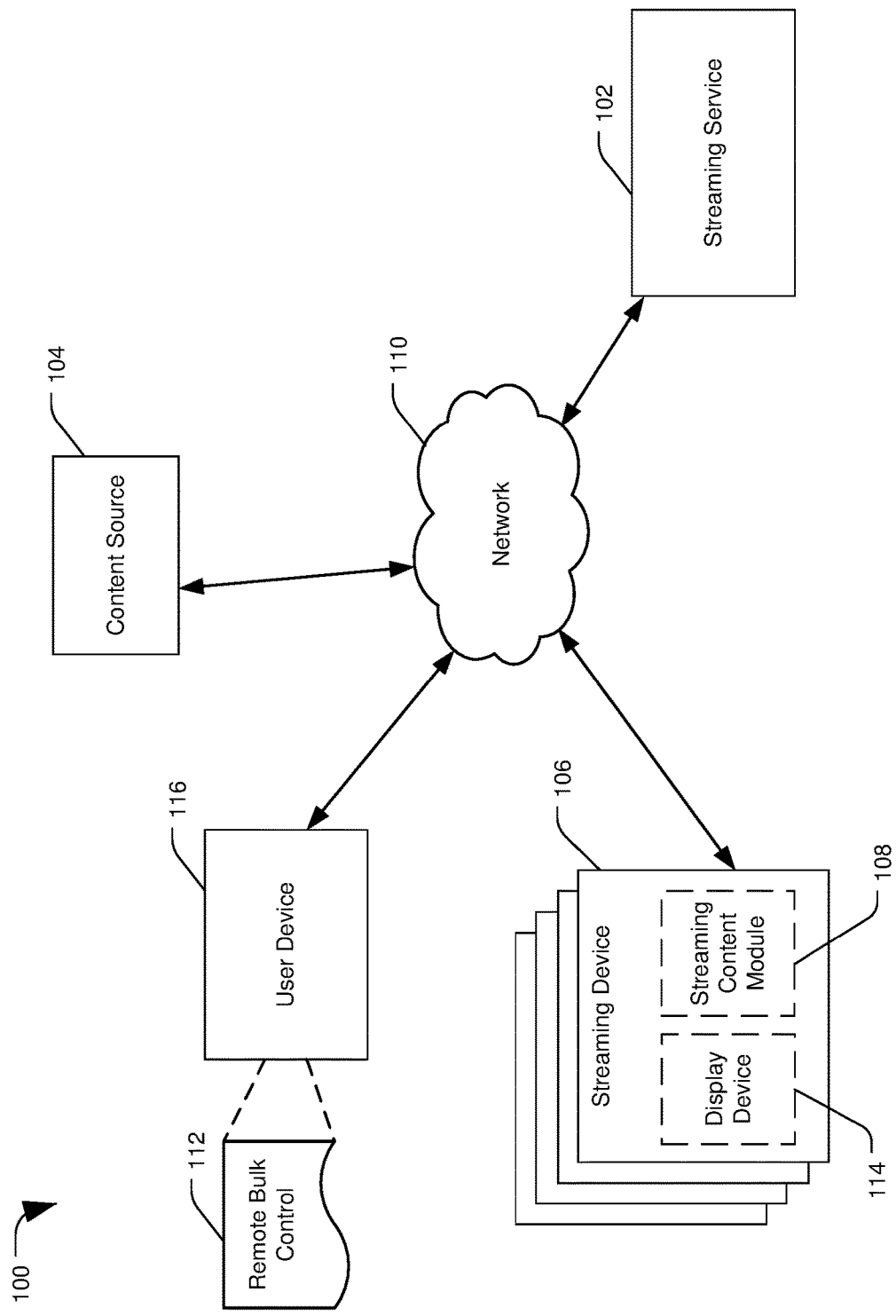
FIG. 1 is a diagram of a system configured to implement remote bulk channel management, in accordance with certain embodiments of the present disclosure.

FIG. 1 depicts a diagram of a system 100 configured to implement remote bulk channel management, in accordance with certain embodiments of the present disclosure. The system 100 may include a streaming service 102, a content source 104, a plurality of streaming devices 106, a user device 116, and a network 110 over which the components of system 100 may communicate and exchange data. Each or any of streaming service 102, content source 104, streaming device 106, user device 116, and network 110 may be implemented via computers, servers, hardware and software modules, or other system components. Further, the system 100 may include a remote bulk channel control interface or application 112 for performing bulk channel management of streaming devices 106.

Streaming service 102 may generate, publish, or broadcast streaming content to streaming devices 106. Some or all of the content, such as video segments or advertisements, may be obtained or transmitted from content source 104. Content source 104 may include one or more servers or databases providing content (e.g., video segments or streams, advertising, music, etc.) that may be displayed or presented at streaming devices 106. In some embodiments, the streaming service 102 may acquire (e.g., download) content from content source 104 and generate streaming content to send to streaming devices 106 over network 110. In some other embodiments, the streaming service 102 may provide content source 104 with a list or sequence of content elements to include in a content feed, and the streaming content can be provided from content source 104 to streaming devices 106 via network 110. The streaming service 102 may provide a plurality of content feed options, such as multiple channels or content categories. Each streaming device 106 may have an independently selected channel playing at any given time. Streaming service 102 may be configured with the capability to adjust or change behavior at the streaming devices 106 (e.g., through commands sent via network 110) to change the channels or content feeds displaying at the streaming devices 106, adjust the volume or display settings, or otherwise modify the content being presented at streaming devices 106. Further, streaming service 102 may include one or more data storage devices, data storage mediums, data storage servers, and related data structures, and may store information about streaming devices 106 or associated client systems or accounts, streaming content data, or other information.

Streaming devices 106, such as computers, smartphones, set-top boxes, or televisions, may receive streaming content such as video feeds. Streaming devices 106 each may include a streaming content module 108 and display device 114. Streaming content module 108 may receive streamed content, such as from streaming service 102 or content source 104 via network 110, and perform any data conversion necessary to display the streaming content on display device 114. In some examples, streaming content module 108 may also generate or load content to display with a stream, such as advertisements. Display device 114 may be a television, monitor, digital billboard, computer, smartphone, or other device having a digital display element. In some examples, a business may stream content to a television or video display device 114 at a business location (e.g., at a bar or restaurant) for the entertainment of customers. Streaming content may include both video segments and advertisements, as well as supplemental overlay data, such as news tickers, sports scores, stock market updates, a listing of current or upcoming video segments, or other data.

Streaming devices 106 may be configured to be controlled via one or more local control options, such as physical remote controls, control elements on a streaming device itself, or other local inputs. As used herein, local controls or local inputs may include control devices physically proximate to the streaming device 106, which may send inputs from the control device to the streaming device 106 via wired electrical connections, infrared signals, Bluetooth, local Wi-Fi, radio frequency, or other limited-range transmission options.

However, in some examples a customer or client of streaming service 102 may have multiple streaming devices 106, potentially distributed between many different locations. For example, a franchise chain may have tens or hundreds of locations, each of which may include one or more streaming devices 106. A manager or owner of a franchise may desire to coordinate or control the content streaming to the streaming devices 106 at multiple locations. Determining what content is being streamed to each device, and changing the channels via local controls, may require contacting each of the locations, which may be time consuming and unreliable. Even if the manager were presented with a method of remotely changing the channel for individual streaming devices 106, the process could be cumbersome.

As an alternative to local and individual remote controls, the system 100 may include a remote bulk channel management or control interface 112. The remote bulk control 112 may provide an interface for accessing determining and changing settings for multiple streaming devices 106 in bulk via a website, application, or other remote or online interface (e.g., a WebView interface). The remote bulk control 112 may be configured to display current settings and details for multiple streaming devices 106 associated with a user or customer account, such as a currently selected content channel, on/off status, volume settings, or other details. In some examples, a user may access the remote bulk control 112 through an application on the user device 112, through a web page (e.g., by logging in to a user portal for an account associated with the user), or through another remote or internet access method.

The remote bulk control 112 may enable a user to change the channel or other settings of all or multiple streaming devices 106 substantially simultaneously (e.g., via messages sent to multiple devices quickly in sequence) and from a single interface. The remote bulk control 112 interface may enable or provide grouping of different streaming devices 106, so that streaming devices may be grouped by geographic location, location within a business, type of business, or any other criteria. Settings for grouped streaming devices 106 may be changed simultaneously, while devices outside of a grouping may be left unchanged. In this manner, a manager or supervisor can determine a status for many streaming devices 106 distributed over a wide area, and change a channel or other settings for all or selected ones of the streaming devices 106 simultaneously.

The user device 116 may include a smartphone, a tablet, a laptop, or another computing device that is internet- or network-capable, such as having cellular data capabilities or Wi-Fi connectivity, to access streaming service 102 via network 110. When the user device 116 accesses the remote bulk control 112, the user device 116 can connect with an application program interface (API) for the streaming service 102 via the network 110. A user may use an interface of the user device 116 to enter changes to be made at one or more streaming devices 106 via the remote bulk control 112, which may be provided to the streaming service 102 API.

In response to the user device 116 accessing the remote bulk control 112 (e.g., by logging in to a user account), the API can determine the streaming devices 106 associated with the user device 116 or associated user account, for example by accessing a database or list of streaming devices 106. The streaming service API may determine settings for each of the user devices 106 associated with the account, either by requesting status information from the streaming devices 106 over network 110, or by looking up an active channel, settings, etc. for individual devices in databases or files at the streaming service 102. The API may then provide the device information and status details to the remote bulk control 112 for display at the user device 116. The remote bulk control 112 may then receive user inputs via the user device 116 for changes to implement at one or more streaming devices 106, which inputs may be provided to the streaming service API. The requested changes may then be implemented at streaming service 102 (where appropriate), or commands may be sent from streaming service 102 to the appropriate streaming devices 106 for implementation. In this manner, a user may change a channel for multiple selected streaming devices 106 simultaneously. An example implementation of system 100 is discussed in more detail in regard to FIG. 2.

Figure 2:
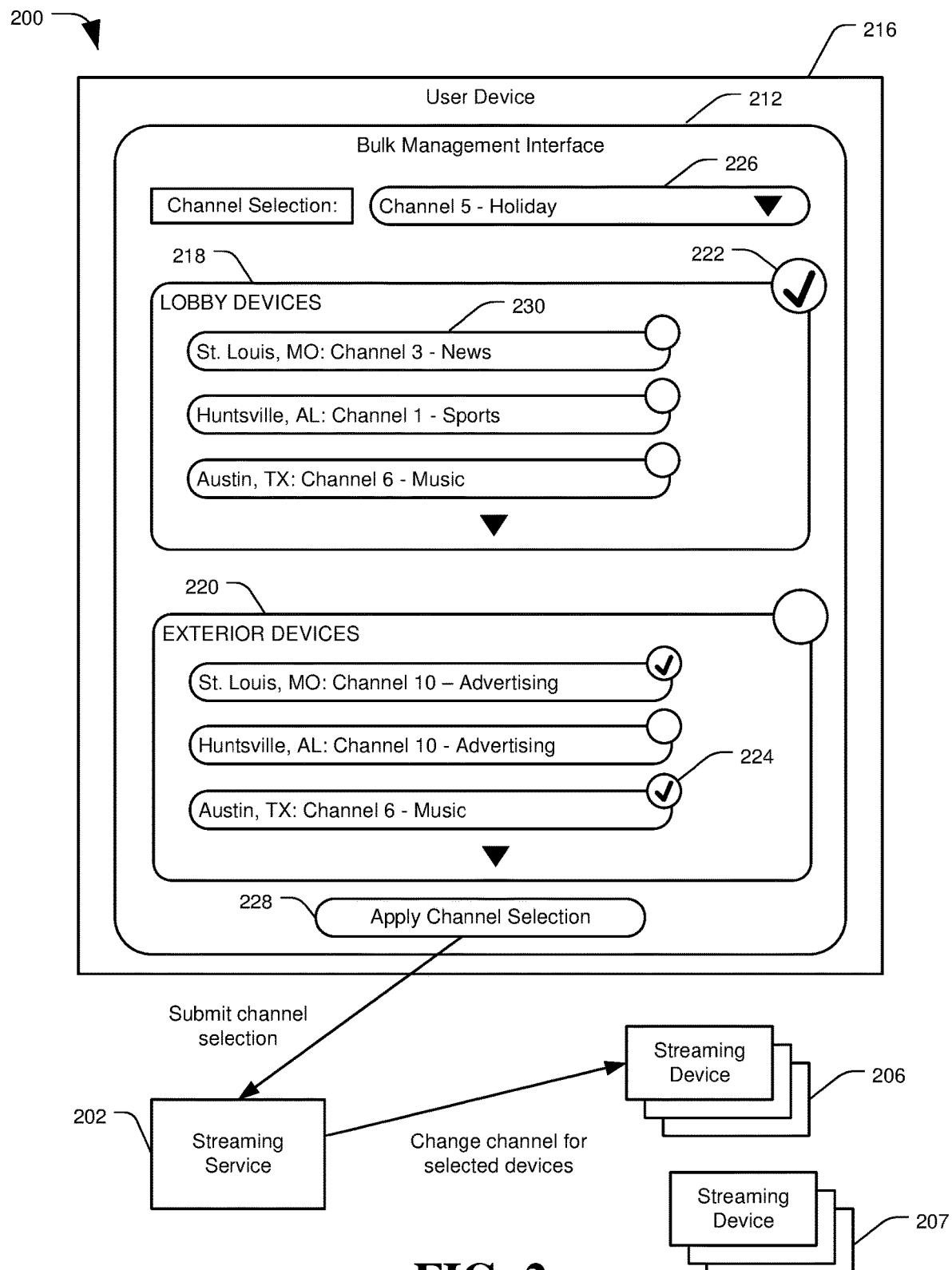
FIG. 2 is a diagram of a system configured to implement remote bulk channel management, in accordance with certain embodiments of the present disclosure.

FIG. 2 depicts a diagram of a system 200 configured to implement remote bulk channel management, in accordance with certain embodiments of the present disclosure. In particular, FIG. 2 presents an example embodiment of a streaming service system configured to utilize a bulk management interface to enable changing settings or channels of multiple streaming devices simultaneously. System 200 may include a streaming service 202, streaming devices 206 and 207, and a user device 216. In some embodiments, the system 200 of FIG. 2 may correspond to the system 100 of FIG. 1.

Streaming devices 206 and 207 may each be a computing device configured to receive streaming content over a network, and display the stream on a display device 114. The streaming device may include a set-top box or streaming stick, a smartphone, a gaming console, a smart TV, or any other device capable of the described operations. The streaming content may be received from a remote source, such as streaming service 202 or content source 104.

User device 216 may be a network-capable computing device, such as a smartphone, tablet, laptop computer, or other computing device. The user device 216 may be used to access a bulk management interface 212, which may interface with an API for streaming service 202 to change the channel or other setting on multiple streaming devices 206, 207 in bulk. Input and changes entered into bulk management interface 212 may be sent to streaming service 202, which may in turn implement the input or changes on the streaming devices 206, 207.

System 200 presents an example embodiment of a bulk management interface 212 implementation. The interface 212 may provide status listings 230 corresponding to each of a plurality of streaming devices 206, 207. In the example embodiment, the status listings 230 may list a geographic location and a current channel setting of a corresponding streaming device. The interface 212 may depict or organize the status listings 230 into one or more groupings, such as "lobby devices" 218 for streaming devices located in business lobbies, and "exterior devices" 220 for streaming devices located at the exterior of a business location. In the example of system 200, there may be three business locations at St. Louis, MO, Huntsville, AL, and Austin, TX, and each business location may have multiple streaming devices situated at different locations, such as in a lobby or at the exterior. The groupings 218, 220 may be automatically generated based on factors such as where streaming devices 206, 207 are set up, or may be manually configured by a user.

The bulk management interface may have selection indicators 222, 224 indicating which status listings 230 have been selected for changing channels or settings. A user may select status listings 230 to change in bulk by clicking or tapping on the selection indicators 222, 224. Entire groupings 218, 220 of status indicators 230 may be selected together by using a selection indicator 222 for a grouping, while individual status listings may be selected using the individual selection indicators 224. The bulk management interface 212 may include a setting selector 226, which may be used to select a channel or other setting to change for selected streaming devices 206, 207 to in bulk. Finally, an apply channel selection or apply changes 228 button or element may be included in bulk management interface 212 to cause the selected settings to go into effect for the selected streaming devices 206, 207.

In the depicted example, a user may use group selection indicator 222 to select all status listings 230 in group 218, and may use individual selection indicators 224 to select the St. Louis and Austin status indicators from group 220. The user may select to change the channel for all selected devices to "Channel 5—Holiday" using the setting selector 226. Once the setting 226 and selected status listings 230 have been chosen, the user may use the 'apply' button 228 to submit the desired changes. The selected status listings 230 and status change 226 may be submitted to streaming service 202. Streaming service 202 may either implement the changes at the streaming service (e.g., by changing a content stream being delivered), or send commands to implement the changes to the selected streaming devices 206. The streaming devices 207 that were not selected for changes may continue to operate without changing any settings. Once the changes have been implemented at streaming devices 206, the streaming service 202 may update the corresponding status indicators 230 in bulk management interface 212 to reflect the new status (e.g., showing that the selected status indicators 230 are now set to Channel 5—Holiday). An example method for implementing remote bulk channel management is discussed in regard to FIG. 3.

Figure 3:
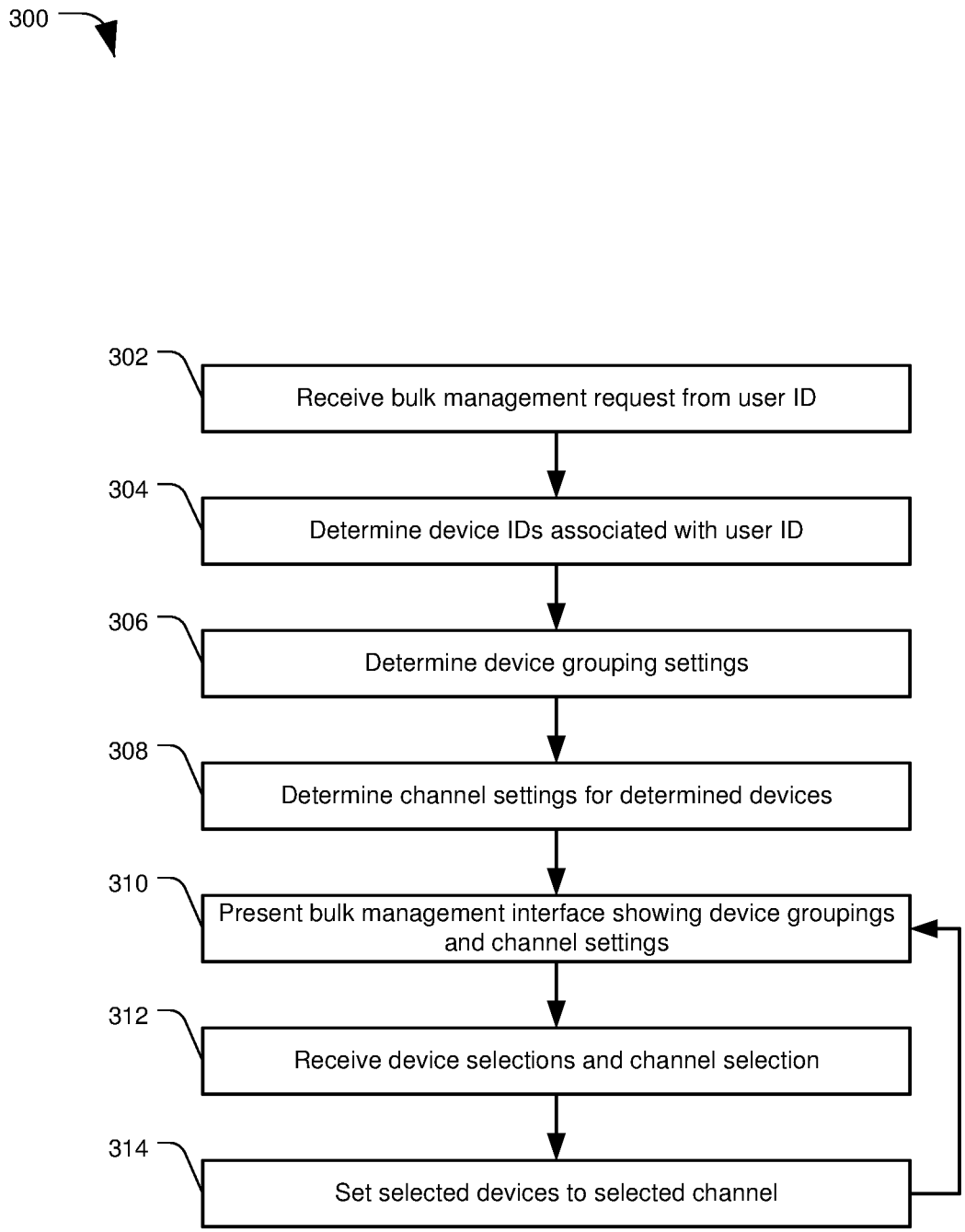
FIG. 3 depicts a flowchart of an example method for implementing remote bulk channel management, in accordance with certain embodiments of the present disclosure.

FIG. 3 depicts a flowchart 300 of an example method for implementing bulk channel management, in accordance with certain embodiments of the present disclosure. In particular, the method of FIG. 3 may be a process for generating and presenting a bulk streaming device management interface, and receiving and implementing bulk channel or setting changes. The method of FIG. 3 may be implemented by systems shown in FIG. 1, such as streaming service 102, streaming devices 106 and streaming content module 108, user device 116, other components, or some combination thereof.

The method may include receiving a bulk management request from a particular user account or user ID, at 302. Submitting the bulk management request may include opening an app or webpage for bulk streaming device management, which may include logging in to a user account or providing identifying information for a user, customer, or client of streaming service 102. The bulk management request may originate from a user device, such as a smartphone or laptop computer.

In response to the bulk management request, the method may include determining one or more device IDs associated with the user ID, at 304. For example, each user ID or account may have one or more associated devices that can be managed in bulk, such as content streaming devices 106 (although the present disclosure is not limited to streaming devices). The streaming service 102 may maintain a database or record of user accounts and associated device identifiers, which may be accessed to determine device and user associations.

At 306, the method may also include determining device grouping settings for the user account or device IDs. For example, the device IDs may be grouped based on default settings of the streaming service, or selections made by the user, as discussed in regard to FIG. 2. The method may also include determining channel or other settings currently set for each of the determined devices, at 308. The settings may be stored at streaming service 102, or may be queried from the streaming devices in response to the bulk management request.

At 310, the method may include presenting a bulk management interface showing the devices associated with the user account in the determined groupings, and showing the channel or other settings for the devices. The bulk management interface may be presented as a graphical user interface (GUI) at the user device, enabling the user to see and modify the settings for the associated streaming devices in bulk.

The method may include receiving device selections and channel or setting selection, at 312. The device selections may include a user selection of which streaming devices should be updated with the channel or setting selection. A user may be able to select all devices, a selected group or groups of devices, individual devices, or combinations thereof. The channel or setting selection may indicate which streaming channel all selected devices should be set to, or other setting adjustments (e.g., turning devices on or off, adjusting advertising preferences, volume control, or other settings).

In response to the device and channel selection, the method may include setting the selected devices to the selected channel, or otherwise adjusting a setting in bulk, at 314. The channel or setting may be able to be adjusted directly at the streaming service (e.g., by changing what content channel is streamed to each selected device), or the streaming service may transmit commands to each selected device directing the device to implement the setting change locally. Once the settings have been changed at the devices, the method may include updating the device settings presented the in bulk management interface, at 310, and receiving any additional changes, at 312.

Figure 4:
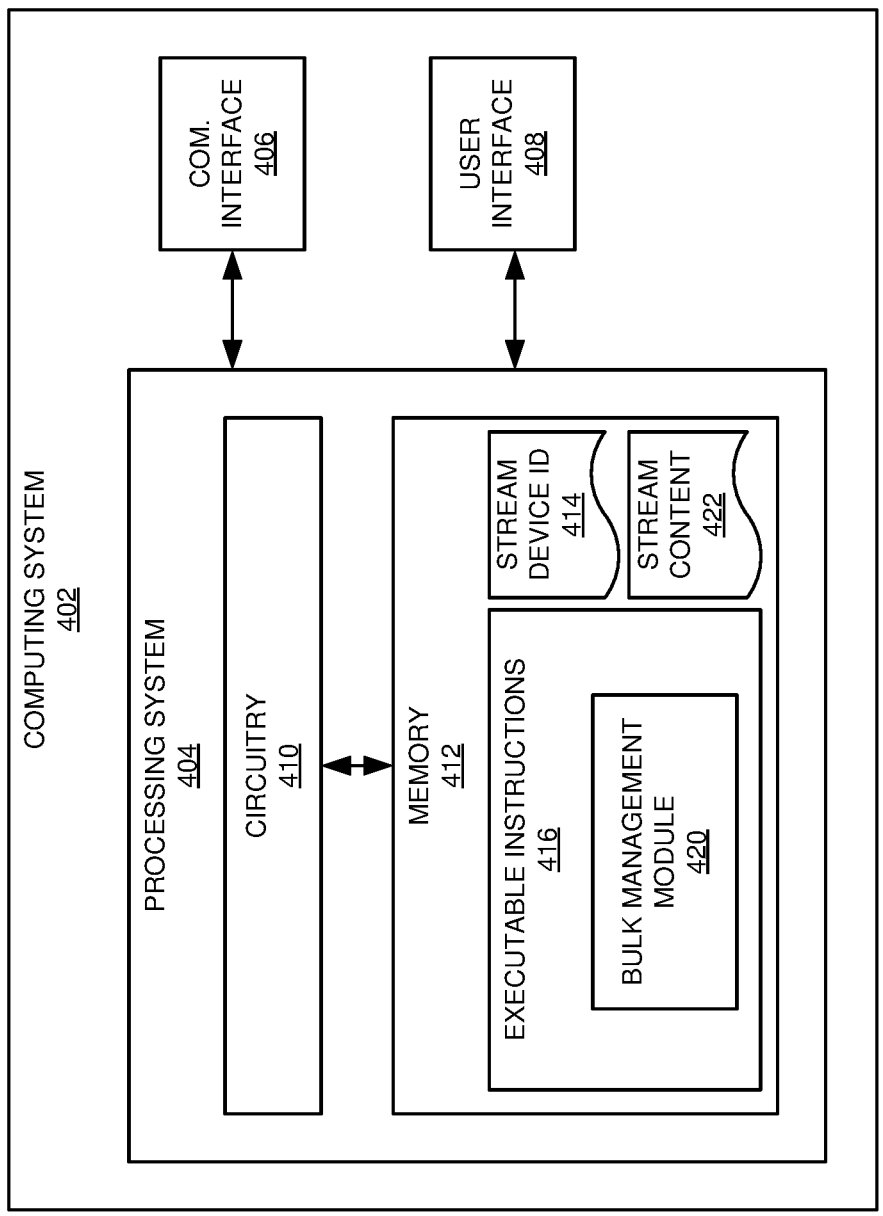
FIG. 4 is a diagram of a system configured to implement remote bulk channel management, in accordance with certain embodiments of the present disclosure.

Turning now to FIG. 4, a diagram of a system 400 configured to implement remote bulk channel management is shown, in accordance with certain embodiments of the present disclosure. In particular, FIG. 4 depicts a computer system 402, which may be an example of any computing system that may be employed to perform the operations of streaming service 102, content source 104, streaming device 106 or streaming content module 108, user device 116, and related processes and methods. Computing system 402 may include a processing system 404, a communication interface 406, and a user interface 408. Computing system 402 may include other components, such as a battery and enclosure, that are not shown for clarity. Computing system 402 may comprise one or more server computing systems, desktop computing systems, laptop computing systems, smartphone devices, tablet devices, set-top or streaming boxes, connected televisions, or any other computing system, including combinations thereof.

Communication interface 406 may comprise components that communicate over communication links, such as network cards, ports, radio frequency (RF), processing circuitry and software, or other communication components. Communication interface 406 may be configured to communicate over metallic, wireless, or optical links. Communication interface 406 may be configured to use Time Division Multiplex (TDM), Internet Protocol (IP), Ethernet, optical networking, wireless protocols, communication signaling, other communication formats, or any combinations thereof. In particular, communication interface 406 may be configured to communicate over a network 110 with streaming service 102, streaming device 106, content source 104, user scanning device 116, or other external systems. Communication interface 406 may also enable communication with local external devices, such as external storage or interface devices.

User interface 408 may comprise components that interact with a user to receive user inputs and to present media or other information. User interface 408 may include a display screen, touch screen, touch pad, keyboard, buttons, speaker, microphone, pointer device or interface, camera or image capture apparatus, communication port, other user input/output apparatus, or any combination thereof. In some examples, user interface 408 may be a module configured to interface with a separate system for presenting information and receiving inputs. For example, computing system 402 may have limited or no direct user input components, but it connects (e.g., via communication interface 406) to a monitor or other device that may receive inputs via touch screen, remote control, or other input method, which inputs are then provided or relayed to computing system 402.

Processing system 404 may be linked to communication interface 406 and user interface 408. Processing system 404 can include processing circuitry 410 and memory device 412. Memory device 412 can store executable instructions 416 or other operating software 416, as well as non-executable data files, such as stream device identifier (ID) data 414 (which may include associated account, security, or authorization data), and stream content 422. Stream device ID 414 may include a unique identifier for one or more streaming devices, associated account identifiers for each streaming device, or other information enabling associated devices with user accounts. Stream content 422 may include video, audio, advertising, or other content of a content stream, which may be provided from streaming service 102 or content source 104 to streaming device 106. There may be multiple potential content streams or channels, which may be switched between at a streaming device.

Processing circuitry 410 may comprise a microprocessor and other circuitry that can retrieve and execute instructions 416 from memory device 412. Memory 412 may comprise a non-volatile data storage medium, such as a disk drive or solid state drive, or volatile memory such as random access memories (RAM) and dynamic RAM (DRAM), or any other memory apparatus. In some examples, processing circuitry 410 may be mounted on a circuit board that may also hold memory device 412 and portions of communication interface 406 or user interface 408.

Executable instructions 416 may comprise computer programs, firmware, or some other form of machine-readable processing instructions. Executable instructions 416 may include a bulk management module 420, although related operations may be handled by multiple different modules or programs (potentially located on multiple computing devices), all operations may be performed by a single module, or additional modules may be included in executable instructions 416. For example, elements or aspects of bulk management module 420 may be implemented by streaming service 102, streaming device 106 or streaming content module 108, user device 116, other systems, or a combination thereof. Executable instructions 416 may further include an operating system, utilities, drivers, network interfaces, applications, or other types of software. When executed by processing circuitry 410, executable instructions 416 may direct processing system 404 to operate computing system 402 as described herein.

Bulk management module 420 may include a set of instructions for generating a bulk management interface, receiving bulk management user inputs, or implementing bulk management setting changes at streaming devices, among other operations. In some embodiments, the operations of bulk management module may correspond to the systems and processes described in regards to FIGS. 2 and 3. For example, bulk management module 420 may receive a bulk management request, and gather details about a requesting user account, streaming devices associated with the account, device grouping settings, and current device settings, for example from stream device ID data 414. In some embodiments, bulk management module 420 may direct collection of some details, such as current device settings, by a streaming device querying streaming devices, e.g. via communication interface 406. The bulk management module 420 may direct that the user account-associated streaming devices be grouped and presented with current channel or setting information via a GUI, for example via user interface 408. The bulk management module 420 may receive user inputs to change device settings in bulk via the GUI, which selections may be sent from a user device to the streaming service. Streaming service may then implement the changes directly, or send instructions for implementing the changes at the streaming devices, based on instructions from the bulk management module 420.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   implementing a remote bulk channel management control for a plurality of streaming devices situated at different geographical locations, including:
   presenting, from a streaming service at a location remote from the plurality of streaming devices, a bulk management interface at a user device showing a geographical location and a current channel setting for each of the plurality of streaming devices;
   receiving, at the streaming service, a setting change request to set multiple streaming devices from the plurality of streaming devices to a same channel via the bulk management interface; and
   implementing, by the streaming service, the setting change request at the multiple streaming devices substantially simultaneously.

2. The method of claim 1 further comprising:
   receiving a bulk management request associated with a user identifier; and
   presenting the bulk management interface in response to the bulk management request.

3. The method of claim 2 further comprising:
   determining the plurality of streaming devices as devices associated with the user identifier.

4. The method of claim 3 further comprising:
   the setting change request includes an indication of a user selection of the multiple streaming devices, the multiple streaming devices being a number less than or equal to the plurality of streaming devices.

5. The method of claim 4 further comprising:
   grouping the plurality of streaming devices into a plurality of groups in the bulk management interface; and
   the user selection of the multiple streaming devices includes a selection of a group to select all streaming devices within the group.

6. The method of claim 5 further comprising:
   the user selection of the multiple streaming devices includes the selection of the group and an individual selection of a streaming device outside the group.

7. The method of claim 6 further comprising:
   the setting change request includes a streaming channel selection from a plurality of streaming channels.

8. A system comprising:
   a streaming service configured to implement a remote bulk channel management control for a plurality of streaming devices located at different geographical regions, the streaming service situated at a location remote from the plurality of streaming devices, the remote bulk channel management control configured to:
   present a bulk management interface at a user device showing a geographical location and a current channel setting for each of the plurality of streaming devices;
   receive a setting change request to set multiple streaming devices from the plurality of streaming devices to a same channel via the bulk management interface; and
   implement the setting change request at the multiple streaming devices substantially simultaneously.

9. The system of claim 8 comprising the remote bulk management control further configured to:
   receive a bulk management request associated with a user identifier;
   present the bulk management interface in response to the bulk management request; and
   determine the plurality of streaming devices as devices associated with the user identifier.

10. The system of claim 8 further comprising:
    the setting change request includes an indication of a user selection of the multiple streaming devices, the multiple streaming devices being a number less than or equal to the plurality of streaming devices.

11. The system of claim 10 comprising the remote bulk management control further configured to:
    group the plurality of streaming devices into a plurality of groups in the bulk management interface; and
    the user selection of the multiple streaming devices includes a selection of a group to select all streaming devices within the group.

12. The system of claim 11 comprising the remote bulk management control further configured to:
    the user selection of the multiple streaming devices includes the selection of the group and an individual selection of a streaming device outside the group.

13. The system of claim 8 comprising the remote bulk management control further configured to:
    the setting change request includes a streaming channel selection from a plurality of streaming channels.

14. A memory device storing instructions that, when executed, cause a processor to perform a method comprising:
    implementing a remote bulk channel management control for a plurality of streaming devices situated at different geographic locations via a streaming service, including:
    presenting a bulk management interface at a user device showing a geographical location and a current channel setting for each of the plurality of streaming devices;
    receiving a setting change request to set multiple streaming devices from the plurality of streaming devices to a same channel via the bulk management interface; and
    implementing the setting change request at the multiple streaming devices substantially simultaneously.

15. The memory device of claim 14 storing instructions that, when executed, cause the processor to perform the method further comprising:
    receiving a bulk management request associated with a user identifier; and
    presenting the bulk management interface in response to the bulk management request.

16. The memory device of claim 15 storing instructions that, when executed, cause the processor to perform the method further comprising:
    determining the plurality of streaming devices as devices associated with the user identifier.

17. The memory device of claim 14 storing instructions that, when executed, cause the processor to perform the method further comprising:
    the setting change request includes an indication of a user selection of the multiple streaming devices, the multiple streaming devices being a number less than or equal to the plurality of streaming devices.

18. The memory device of claim 17 storing instructions that, when executed, cause the processor to perform the method further comprising:
    grouping the plurality of streaming devices into a plurality of groups in the bulk management interface; and the user selection of the multiple streaming devices includes a selection of a group to select all streaming devices within the group.

19. The memory device of claim 18 storing instructions that, when executed, cause the processor to perform the method further comprising:
the user selection of the multiple streaming devices includes the selection of the group and an individual selection of a streaming device outside the group.

20. The memory device of claim 14 storing instructions that, when executed, cause the processor to perform the method further comprising:
the setting change request includes a streaming channel selection from a plurality of streaming channels.

* * * * *